(12) United States Patent
Kim

(10) Patent No.: US 11,910,189 B2
(45) Date of Patent: Feb. 20, 2024

(54) ELECTRONIC APPARATUS FOR DISPLAYING IMAGE USING VISUAL AFTERIMAGE OF LIGHT SOURCE

(71) Applicant: KONO CORPORATION LTD, Seoul (KR)

(72) Inventor: Geon Ho Kim, Seoul (KR)

(73) Assignee: KONO CORPORATION LTD (KR)

( * ) Notice: Subject to any disclaimer, the term of this patent is extended or adjusted under 35 U.S.C. 154(b) by 0 days.

(21) Appl. No.: 17/580,941

(22) Filed: Jan. 21, 2022

(65) Prior Publication Data

US 2022/0150697 A1    May 12, 2022

Related U.S. Application Data

(63) Continuation of application No. 16/075,440, filed as application No. PCT/KR2016/008953 on Aug. 16, 2016, now Pat. No. 11,284,252.

(30) Foreign Application Priority Data

Feb. 5, 2016    (KR) .................. 10-2016-0015023

(51) Int. Cl.
*H04W 12/06*  (2021.01)
*G01S 19/01*  (2010.01)
(Continued)

(52) U.S. Cl.
CPC ............... *H04W 12/06* (2013.01); *F21S 4/00* (2013.01); *F21V 23/0492* (2013.01); *F21V 33/0052* (2013.01); *G01S 19/01* (2013.01); *G06F 1/163* (2013.01); *G06F 1/1639* (2013.01); *G06F 1/1647* (2013.01); *G06F 1/1654* (2013.01); *G06F 3/017* (2013.01); *G09F 9/33* (2013.01); *G09F 19/12* (2013.01); *H05B 47/105* (2020.01);
(Continued)

(58) Field of Classification Search
CPC ..... H04W 12/06; H04W 12/68; H04W 12/33; F21S 4/00; F21V 23/0492; F21V 33/0052; G01S 19/01; G06F 1/163; G06F 1/1639; G06F 1/1647; G06F 1/1654; G06F 3/017; G09F 9/33; G09F 19/12; H05B 47/105; H05B 47/19; H04L 63/0884; Y02B 20/40
See application file for complete search history.

(56) References Cited

U.S. PATENT DOCUMENTS 5,136,557 A    8/1992  Plawker et al.
5,406,300 A    4/1995  Tokimoto et al.
(Continued)

FOREIGN PATENT DOCUMENTS

JP    2009025539 A    2/2009
JP    2012163807 A    8/2012
(Continued)

*Primary Examiner* — Grant Sitta
(74) *Attorney, Agent, or Firm* — Harness, Dickey & Pierce, P.L.C.

(57) ABSTRACT

An electronic apparatus for displaying an image by using visual afterimage of a light source, the apparatus comprises a communication unit performing data communication to a light source; a control unit controlling light emission of the light source; a body storing the communication unit and the control unit; and a fixing unit for attaching the body on a body of a user, wherein the light source provides an image based on changes in spatial position of the light source.

5 Claims, 16 Drawing Sheets

(51) Int. Cl.

| | | |
|---|---|---|
| *G06F 3/01* | (2006.01) | |
| *G06F 1/16* | (2006.01) | |
| *F21S 4/00* | (2016.01) | |
| *H05B 47/19* | (2020.01) | |
| *H05B 47/105* | (2020.01) | |
| *G09F 9/33* | (2006.01) | |
| *G09F 19/12* | (2006.01) | |
| *F21V 23/04* | (2006.01) | |
| *F21V 33/00* | (2006.01) | |
| *H04L 9/40* | (2022.01) | |
| *H04W 12/68* | (2021.01) | |

(52) U.S. Cl.
CPC .......... *H05B 47/19* (2020.01); *H04L 63/0884* (2013.01); *H04W 12/68* (2021.01); *Y02B 20/40* (2013.01)

(56) References Cited

U.S. PATENT DOCUMENTS

| | | | |
|---|---|---|---|
| 5,444,456 A | | 8/1995 | Ohta et al. |
| 5,457,900 A | | 10/1995 | Roy et al. |
| 5,548,300 A | | 8/1996 | Tokimoto |
| 5,670,971 A | | 9/1997 | Tokimoto et al. |
| 5,748,157 A | | 5/1998 | Eason |
| 5,800,039 A | | 9/1998 | Lee |
| 6,239,774 B1 | | 5/2001 | Altman |
| 6,265,984 B1 | * | 7/2001 | Molinaroli ........... H05B 47/155 340/815.45 |
| 6,404,409 B1 | | 6/2002 | Solomon |
| 6,894,663 B1 | | 5/2005 | Altman |
| 6,954,658 B2 | | 10/2005 | Engstrom et al. |
| 7,030,420 B2 | | 4/2006 | Shimomura et al. |
| 7,096,046 B2 | | 8/2006 | Shapiro et al. |
| 7,236,146 B2 | | 6/2007 | Smedley et al. |
| 7,287,874 B2 | | 10/2007 | Irisawa |
| 7,355,573 B2 | | 4/2008 | Ogawa |
| 7,372,430 B2 | | 5/2008 | Shinohara |
| 8,049,688 B2 | | 11/2011 | Yu et al. |
| 8,771,085 B1 | | 7/2014 | Clyde et al. |
| D799,355 S | | 10/2017 | Riffner |
| 9,895,620 B1 | | 2/2018 | Walterscheid |
| 10,108,082 B1 | | 10/2018 | Hoth |
| 2003/0080924 A1 | | 5/2003 | Bentley |
| 2003/0100332 A1 | | 5/2003 | Engstrom et al. |
| 2003/0227425 A1 | | 12/2003 | McKay et al. |
| 2008/0007498 A1 | | 1/2008 | Yu et al. |
| 2011/0058363 A1 | * | 3/2011 | Fattizzi ............... F21V 23/0407 362/190 |
| 2013/0222270 A1 | | 8/2013 | Winkler et al. |
| 2013/0264966 A1 | | 10/2013 | Hazawa |
| 2014/0184386 A1 | * | 7/2014 | Regler ................... G08B 5/228 340/7.61 |
| 2014/0204583 A1 | | 7/2014 | Hung |
| 2014/0239065 A1 | * | 8/2014 | Zhou ..................... G06F 1/1677 235/380 |
| 2015/0131326 A1 | | 5/2015 | Chien |
| 2015/0154853 A1 | | 6/2015 | Yousef et al. |
| 2015/0261946 A1 | | 9/2015 | Yoon et al. |
| 2016/0027375 A1 | | 1/2016 | Breedvelt-Schouten et al. |
| 2016/0080888 A1 | | 3/2016 | Kreitzer et al. |
| 2016/0381553 A1 | * | 12/2016 | Lee ........................ H04L 67/34 455/411 |
| 2019/0137948 A1 | | 5/2019 | Yaghmour |

FOREIGN PATENT DOCUMENTS

| | | |
|---|---|---|
| KR | 20040049916 A | 6/2004 |
| KR | 20150065071 A | 6/2015 |

* cited by examiner (A) (B)

ELECTRONIC APPARATUS FOR DISPLAYING IMAGE USING VISUAL AFTERIMAGE OF LIGHT SOURCE

This is a continuation application of U.S. Ser. No. 16/075,440 filed Aug. 3, 2018, which is a 371 of PCT/KR2016/008953 filed Aug. 16, 2016, which claims priority to Republic of Korea Application No. 10-2016-0015023 filed Feb. 5, 2016 all of which are incorporated by reference in their entireties.

The present invention relates to a wearable apparatus that is an electronic apparatus displaying an image by using visual afterimage of a light source.

Various apparatuses are present for cheering a singer in a concert hall, or for an athlete. Recently, for displaying a cheering phrase, a mobile phone and a tablet PC have becomes available, whereby users display cheering phrases by using a mobile phone, a tablet PC, etc. Such a cheering picket requires to be maintained a state in which the content described in the picket is fixed without movement. Meanwhile, sticks are also used as cheering apparatuses. Cheering sticks are used for cheering in a cluster from by shaking the same with other users.

SUMMARY OF THE INVENTION

An object of the present invention is to provide a method of simply providing a cheering image by using a wearable apparatus and a display apparatus performing data communication with the wearable apparatus. In addition, another object of the present invention is to provide a method of simply providing a cheering image in a cluster form with various users by using the apparatus.

An electronic apparatus of the present invention includes: a communication unit performing data connection to a light source; a control unit controlling light emission of the light source; a body storing the communication unit and the control unit; and a fixing unit for attaching on the body in a body of a user.

According to the present invention, there is provided a wearable electronic apparatus capable of simply displaying a cheering image in a cluster form with various users, and thus providing cheering methods in a cluster form through various forms and directing methods.

DETAILED DESCRIPTION OF THE INVENTION

The present invention is implemented by an electronic apparatus including: a communication unit performing data connection to a light source; a control unit controlling light emission of the light source; a body storing the communication unit and the control unit; and a fixing unit for attaching the body in a body of a user, wherein the light source provides an image on the basis of changes in a spatial position of the light source.

Figure 1:
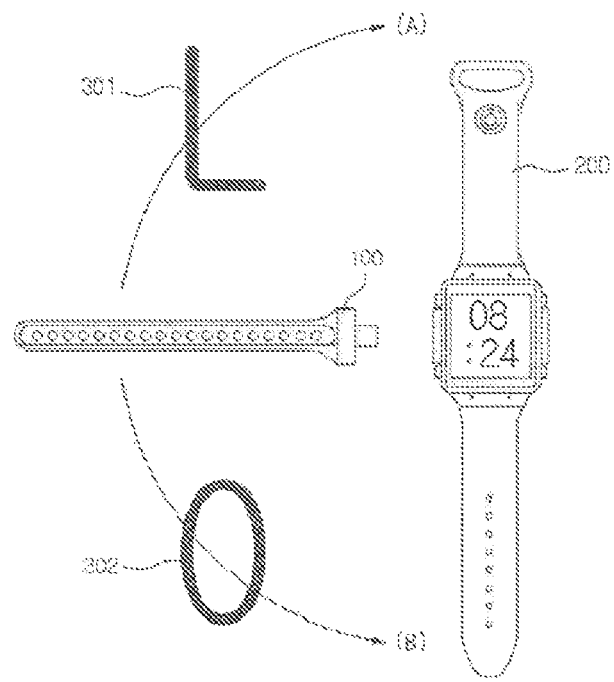
FIG. 1 is a view of an image displaying apparatus according to an embodiment.

FIG. 1 is a view showing an image display apparatus, and the image display apparatus includes a display apparatus 100 and a wearable apparatus 200. The image display apparatus according to an embodiment is a cheering apparatus, and displays a cheering phrase or cheering image. The display apparatus displays an image by using an afterimage (persistence of vision) effect. For example, when a user shakes the display apparatus in a direction to A and then in a direction to B of FIG. 1, according to a trajectory of the display apparatus, afterimage of light emitted by the display apparatus is left in the retina of the user, and thus the image display apparatus provides an image recognized by the user according to afterimage of an image such as L 301 and O 302 in response to changes in position of the display apparatus.

Figure 2:
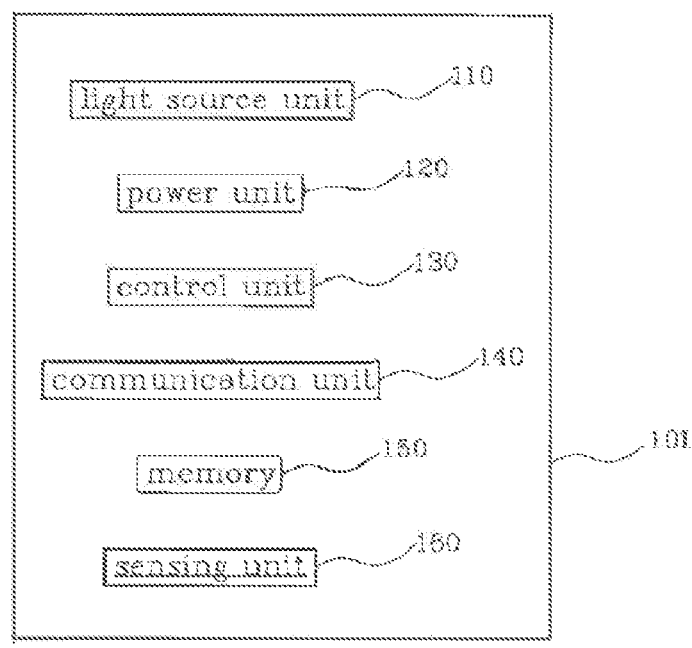
FIGS. 2 and 3 are views of a block diagram and a deployed diagram of a display apparatus according to an embodiment.
Figure 3:
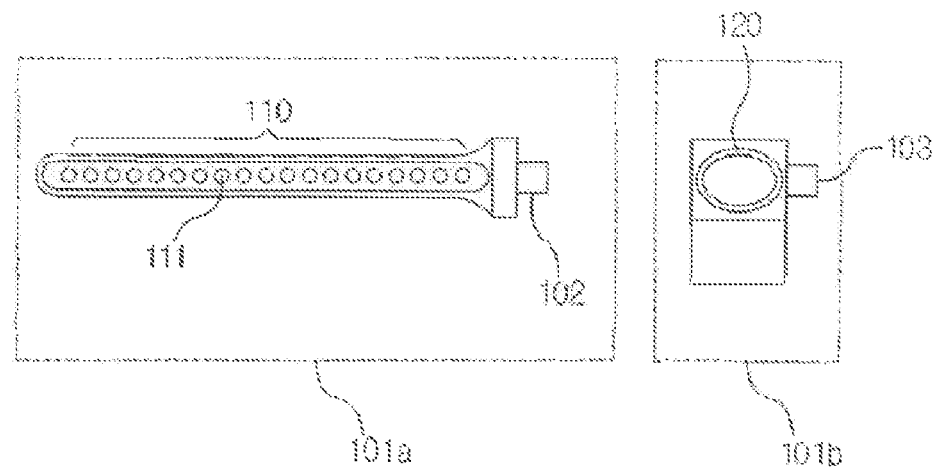

A display apparatus of FIGS. 2 and 3 is an LED bar including a light source unit 110, a power unit 120, a control unit 130, a communication unit 140, a memory 150, a sensing unit 160, and a housing 101 storing at least one of the above components. In other words, the housing 101 is a casing, and functions as a body. According to an embodiment, the display apparatus includes a light source unit 110 and a housing 101. When the display apparatus operates by being controlled by the wearable apparatus, the display apparatus includes a light source unit 110 and a housing 101. At least one of other components such as the power unit 120, the control unit 130, the communication unit 140, the memory 150), and the sensing unit 160 may be omitted according to an embodiment.

The housing 101 stores the light source unit 110, the power unit 120, the control unit 130, the communication unit 140, the memory 150, and the sensing unit 160, and is configured such that the light source unit 110 is separated therefrom. Referring to an embodiment of FIG. 3, the housing 101 further includes a coupling unit. For example, the housing includes at least one of a first coupling unit 102 and a second coupling unit 103. In a first housing 101a, the light source unit 110 is included. In the first housing 101a, the first coupling unit 102 is provided, and the first coupling unit 102 is coupled with a coupling unit (not shown) formed in a second housing 101b storing the components except for the light source unit. Accordingly, the first housing 101a is detached from the second housing 101b through the first coupling unit 102. The coupling unit includes a data line to transfer to the light source unit a control signal for the light source transmitted from the control unit within the housing. Similarly, the second coupling unit 103 formed in one side of the housing is coupled with a coupling unit 202 formed in a wearable apparatus of FIG. 5, and thus the display apparatus is detached from the wearable apparatus. The coupling unit includes a data line to transfer a control signal from the wearable apparatus to the display apparatus. The housing 101 further includes a hand strap. The hand strap is provided in one side of the housing, or in one side of the light source unit. When the hand strap has a form of a ring shape with a hollow part, the user may put his or her finger thereon. In an upper part of the light source unit, a ring shaped hand strap is provided so that a user puts his or her finger thereon so that the display apparatus may not be separated from the wearable apparatus or from the user's hand.

The light source unit 110 includes at least one light source 111. The light source may be arranged in the light source unit 110 in a linear form. The light source may provide afterimage effects of various colors depending on how the user shakes it, or may emit light as lighting. The light source may emit lights of three primary colors which are red (R), green (G), and blue (B). The light source may be an LED capable of emitting three primary colors. Alternatively, a plurality of light sources capable of emitting respective colors may be configured in one set and arranged in the light source unit. Herein, among one light source emitting red light, one light source emitting green light, and one light source emitting blue light, at least one light source constitutes one light source set. The light source set configured as above is arranged in the light source unit. In the light source unit, 16 or more RGB light sources may be arranged in a linear form or in a zigzag form.

The light source unit may be configured with at least one of a collapsible structure where a length thereof is expandable, a part thereof having a slide structure so as to overlap in a longitudinal direction to be expandable and with solid material so as to be configured not to be bent, and with flexible material so as to be configured to be flexible. When the light source unit is configured with solid material, the light source unit may expand by using a solid part of the light source unit that is configured with a single product, or by coupling an extension unit (not shown) where a number of solid products is coupled, or by configuring the solid part in a collapsible structure.

When the light source unit is configured with flexible material, the light source may be arranged in a flexible light source unit. For example, LEDs may be linearly arranged in a light source unit configured with a string so that an afterimage effect is provided as much as the entire length of the arm. The power unit 120 provides power for operating the display apparatus. The power unit may store a battery. The power unit may obtain power required for operating the display apparatus from the stored battery, and provide to each component. FIG. 3 shows a state where the power unit is shown as a cover of the housing is opened. The power unit may include a charging unit (not shown) for charging the battery or for detaching the battery.

The control unit 130 controls light emission of the display apparatus according to an embodiment. The control unit may display an image corresponding to image data received form an external apparatus by controlling the light source unit. The control unit may determine a position, a movement direction, a movement time, a movement speed, etc. of the light source unit by using sensing data received from the sensing unit. In addition, the control unit may determine a power state by using power data received from the power unit. The control unit may perform data communication with an external apparatus by controlling the communication unit.

The communication unit 140 performs data communication between the display apparatus and the wearable apparatus. The communication unit may transmit sensing data of the display apparatus which is generated in the sensing unit 160 to the wearable apparatus. The communication unit may transfer image related data received from the wearable apparatus or control data to the control unit so as to control light emission of the light source unit. Alternatively, the communication unit may directly transfer control data received from the wearable apparatus to the light source unit so that the wearable apparatus directly controls light emission of the light source.

The memory 150 may include program data required for operating the display apparatus, temporary data generated while operating the display apparatus, and image data received from an external apparatus. The memory stores control data received form an external apparatus, and recording mediums generally used such as RAM, ROM, FLASH memory, SSD, etc. are used for the same.

The sensing unit 160 may sense a position, a movement direction, a movement time, a movement speed, etc. of the light source unit. For example, the sensing unit 160 may include an acceleration sensor, a gyro sensor, a GPS sensor, etc. Accordingly, the sensing unit 160 may determine a movement speed of the display apparatus by using an acceleration sensor, determine a movement direction of the display apparatus by using a gyro sensor, and determine a position of the display apparatus by using a GPS sensor.

The display apparatus may be used independently or with the wearable apparatus. The display apparatus may independently display an image according to an afterimage effect, or display an image according to an afterimage effect by being controlled by the wearable apparatus. The wearable apparatus controls operation of the display apparatus to provide an afterimage effect. The display apparatus is physically coupled to the wearable apparatus and performs communication in a wired or wireless manner. Accordingly, the wearable apparatus may transfer to the display apparatus a control signal for controlling operation of the display apparatus.

Figure 4:
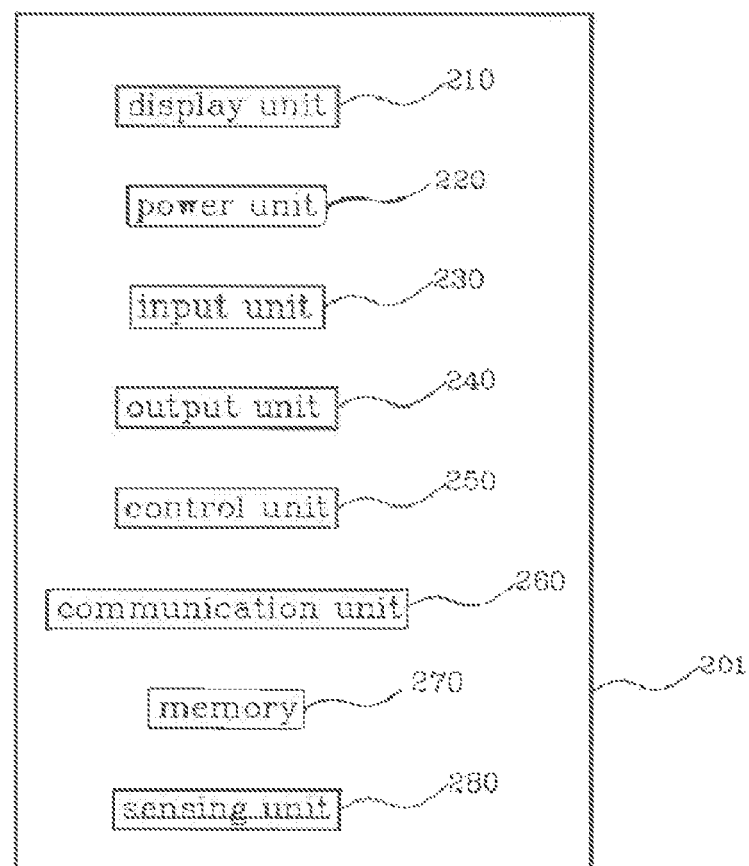
FIGS. 4 and 5 are views of a block diagram and an external perspective diagram of a wearable apparatus according to an embodiment.

In FIG. 4, the wearable apparatus includes a display unit 210, a power unit 220, an input unit 230, an output unit 240, a control unit 250, a communication unit 260, a memory 270, a sensing unit 280, and a housing 201. According to an embodiment, at least one of the display unit 210, the input unit 230, the output unit 240, the memory 270, and the sensing unit 280 may be omitted.

The housing 201 may be a casing storing at least one of the display unit 210, the power unit 220, the input unit 230, the output unit 240, the control unit 250, the communication unit 260, the memory 270, and the sensing unit 280, and may function as a body. The display unit 210 outputs a control screen and an operation screen of the wearable apparatus, and is configured with a display panel such as LCD, LED, etc. and an LED light source. The display unit may output an image or information according to a control of the control unit. The power unit 220 provides power for operating the wearable apparatus. The power unit 220 may include a battery. The power unit 220 may obtain power for operating the wearable apparatus from the battery that is detachable, and provide to each component of the wearable apparatus. The power unit 220 may store a battery that is detachable. The input unit 230 may include at least one input means such as keyboard, touch screen, microphone. The input unit may transfer a user input to the control unit. The control unit may control operation of the wearable apparatus on the basis of a user input obtained by using the input unit.

The output unit 240 may include a vibration unit and a speaker, and output vibration or audio by using vibration or audio data according to a control of the control unit.

The control unit 250 controls operation of the wearable apparatus according to an embodiment and light emission of the display apparatus, and transmits a control signal to the display apparatus. The control unit 250 controls light emission of the light source on the basis of at least one of a spatial position at which the light source is positioned based on the wearable apparatus, a relative direction where the light source is positioned based on the wearable apparatus, and a distance between the wearable apparatus and the light source. The control unit 250 controls operations of a watch, a timer, and an alarm so that the wearable apparatus implements a function of an electronic watch. In addition, the control unit 250 may store image data by receiving the same from an external apparatus. Alternatively, the control unit 250 may store in the memory 270 a phrase that will be transmitted to the display apparatus by receiving the same from an external apparatus, store in the memory 270 a phrase input by the user through the input unit 230, or transmit a phrase to the display apparatus through the communication unit 260. The control unit may transmit an image or phrase stored in the memory 270 to the display apparatus through the communication unit 260.

The communication unit 260 performs data communication between the wearable apparatus and an external apparatus. For example, the communication unit 260 performs data communication between the display apparatus and the wearable apparatus, and receives sensing data from the display apparatus. The communication unit 260 may transfer to the display apparatus image related data or control data. Based on the same, the display apparatus controls light emission of the light source unit. Alternatively, the communication unit 260 may directly transfer to the display apparatus control data for the light source unit of the display apparatus, so that the wearable apparatus may directly control light emission of the light source of the display apparatus.

The memory 270 includes program data required for operating the wearable apparatus, and temporary data generated while operating the wearable apparatus. The memory may include image data and phrase data which are received from an external apparatus. The memory may be a recording medium that is generally used such as RAM, ROM, FLASH memory, etc.

The sensing unit 280 senses movement of the wearable apparatus. When the display apparatus operates by being coupled with the wearable apparatus, the sensing unit 280 senses movement of the wearable apparatus, and thus senses a position, a movement direction, a movement time, a movement speed, etc. of the light source unit attached in the display apparatus. The sensing unit 280 includes an acceleration sensor, a gyro sensor, a GPS sensor, etc.

Figure 5:
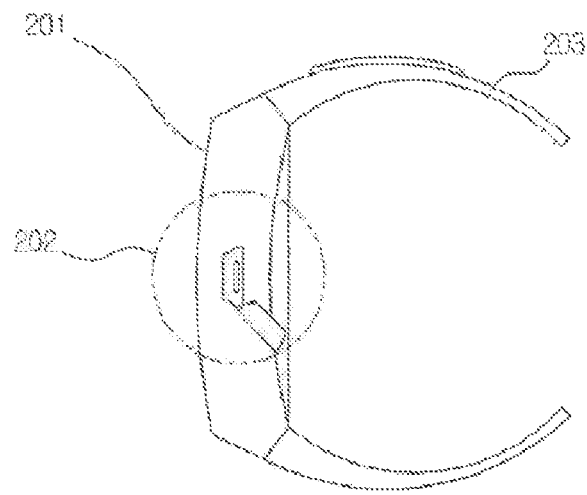

A wearable apparatus having a form of a watch of FIG. 5 further includes, in addition to the housing 201, a coupling unit 202 and a fixing unit 203 which are formed in a part of the housing 201. The coupling unit 202 is coupled with the display apparatus according to an embodiment. The coupling unit 202 is coupled with the coupling unit of the display apparatus. The fixing unit 203 is coupled to the housing 201 such as a strap attached in a general watch. For example, the fixing unit 203 may be a form where two straps that are used in a general watch are fixed by a chain, or may be a form of a bangle type where one side thereof is coupled to a watch. The fixing unit 203 has a replaceable configuration such that the fixing unit 203 is detached from the coupling unit 202. The user may wear the wearable apparatus on his or her body by using the fixing unit 203.

Figure 6:
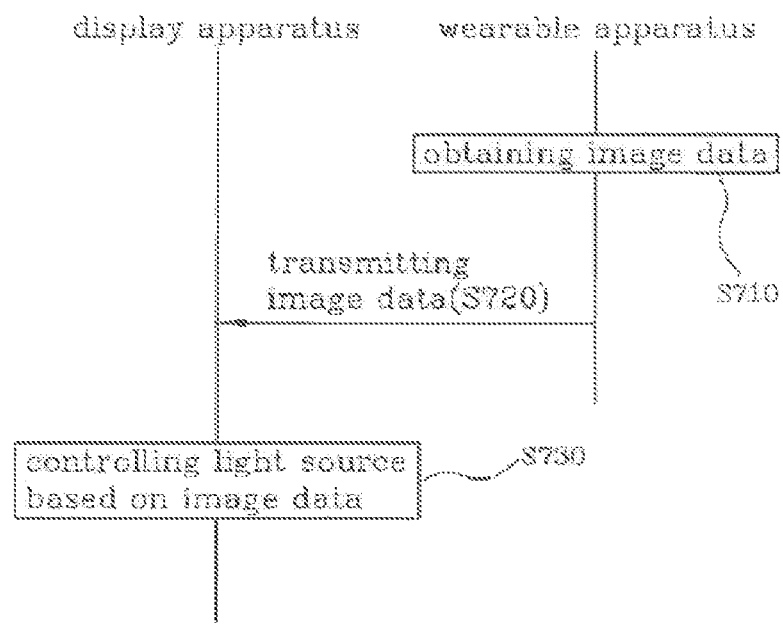
FIG. 6 is a view of a flowchart showing an image displaying method of a wearable apparatus according to an embodiment.

Hereinafter, a method of displaying an image by using any one of the wearable apparatus and the display apparatus will be described. Each embodiment may be implemented by being combined with another embodiment, and a method of displaying an image of the wearable apparatus will be described with reference to FIG. 6. In step S710, the wearable apparatus obtains image data. The wearable apparatus may obtain image data from a smartphone, a desktop, or a web server. Then, in step S720, the wearable apparatus transmits the image data to the display apparatus. In step S730, the display apparatus having received the image data controls the light source on the basis of the received image data.

Figure 7:
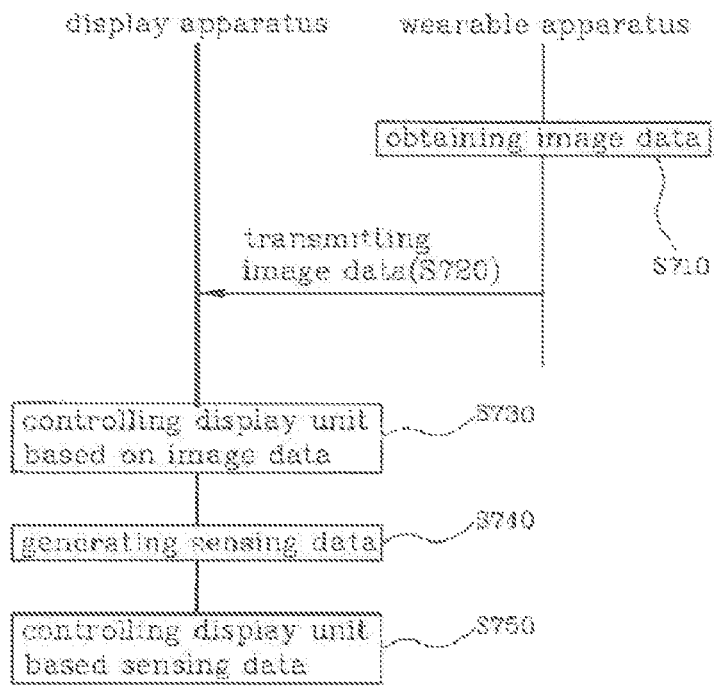
FIG. 7 is a view of a flowchart of controlling light emission of a light emitting unit by sensing motion of a display apparatus by itself according to an embodiment.

In FIG. 7, the display apparatus controls light emission of the light source according to movement information of the display apparatus. In step S740, the display apparatus generates sensing data, and in step S750, controls the light source according to the sensing data. Accordingly, the display apparatus controls light emission of the light source such that an image provided to the user according to an afterimage effect is constantly displayed in consideration of a movement speed and a movement direction even though the movement speed of the display apparatus is irregular. For example, when the light source moves fast, changes in speed of a pixel value represented by the light source may be fast, and thus the light source may provide a corresponding image without distortion. Alternatively, when the light source moves slowly, changes in speed of a pixel value represented by the light source may be slow.

Figure 8:
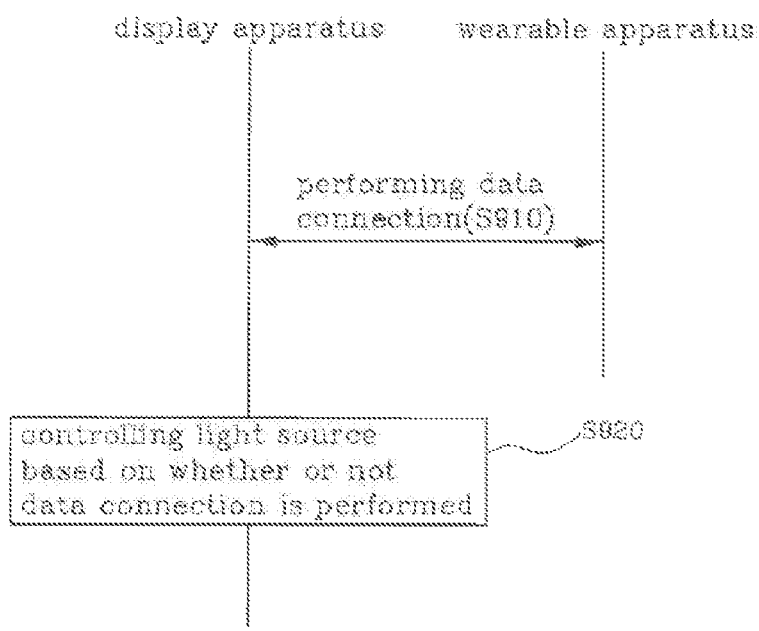
FIG. 8 is a view of a flowchart showing operation of a display apparatus according to an embodiment.

In FIG. 8, in step S910, the display apparatus performs data connection to the wearable apparatus. As a method for the data connection, a method of connecting in a wired/wireless manner, or a connection method using a terminal may be used. In step S920, the display apparatus controls the light source on the basis whether or not data connection to the wearable apparatus is performed. For example, the display apparatus controls the light source when only data connection to the wearable apparatus is performed. The display apparatus controls the light source when only authentication data is received from the wearable apparatus. In other words, the display apparatus may control the light source unit when the wearable apparatus including authentication data is coupled therewith, and may not control the light source when the wearable apparatus not including authentication data is coupled therewith.

The display apparatus maintains an active state after being coupled with the wearable apparatus for at least one time, and the display apparatus controls the light source by maintaining an active state when authentication data is received from the wearable apparatus even though the wearable apparatus is detached therefrom.

Figure 9:
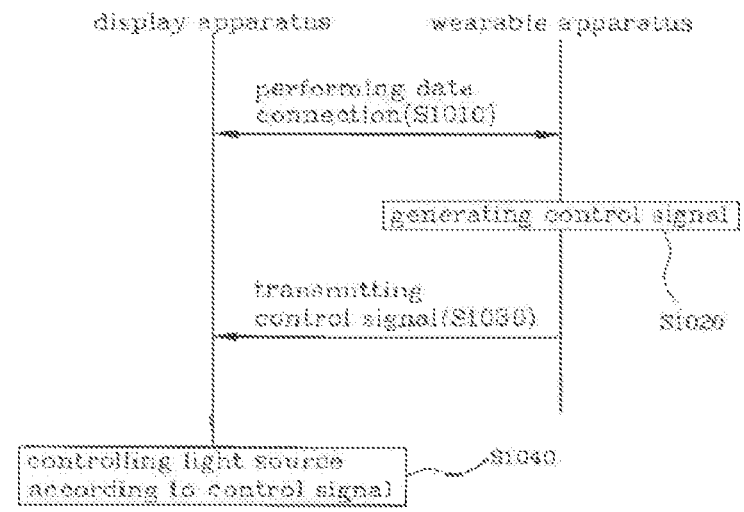
FIG. 9 is a view of a flowchart of directly controlling, by a wearable apparatus, a display apparatus.

In FIG. 9, when the display apparatus and the wearable apparatus are coupled with each other in step S1010, in step S1020, the wearable apparatus generates a control signal. The wearable apparatus may generate a control signal for controlling the display apparatus. In step S1030, the wearable apparatus transfers the generated control signal to the display apparatus. In step S1040, the display apparatus displays an image by controlling the light source according to the control signal received from the wearable apparatus.

Figure 10:
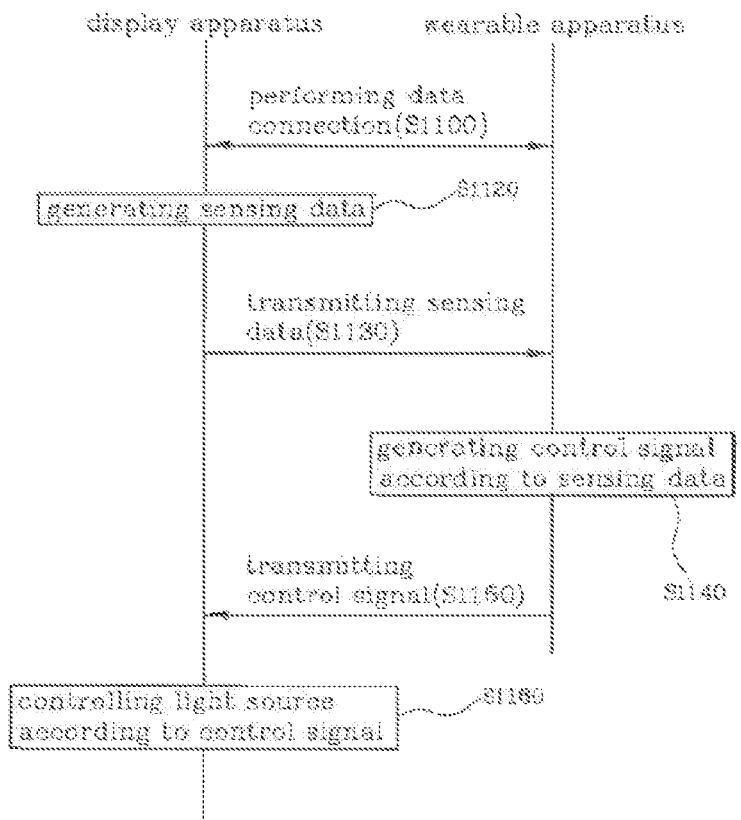
FIG. 10 is a view of a flowchart showing a method of controlling, by a wearable apparatus, a display apparatus by using sensing data received from the display apparatus.

In FIG. 10, first, in step S1110, the display apparatus and the wearable apparatus perform data connection with each other. Then, in step S1120, the display apparatus generates sensing data. The display apparatus measures a position of the display apparatus, a movement direction of the display apparatus, a movement speed of the display apparatus, a time during which the display apparatus moves in one direction, etc. by using the sensing unit. Then, in step S1130, the display apparatus transfers the generated sensing data to the wearable apparatus. In step S1140, the wearable apparatus generates a control signal according to the received sensing data. The control signal is a control signal for controlling the display apparatus. For example, the wearable apparatus generates a control signal for controlling operation of the light source of the display apparatus on the basis of a movement speed, a movement direction, etc. of the display apparatus which are received from the display apparatus. In step S1150, the wearable apparatus transfers the generated control signal to the display apparatus. In step S1160, the display apparatus controls operation of the light source unit according to the received control signal. Accordingly, the display apparatus may display an image according to an afterimage effect.

Figure 11:
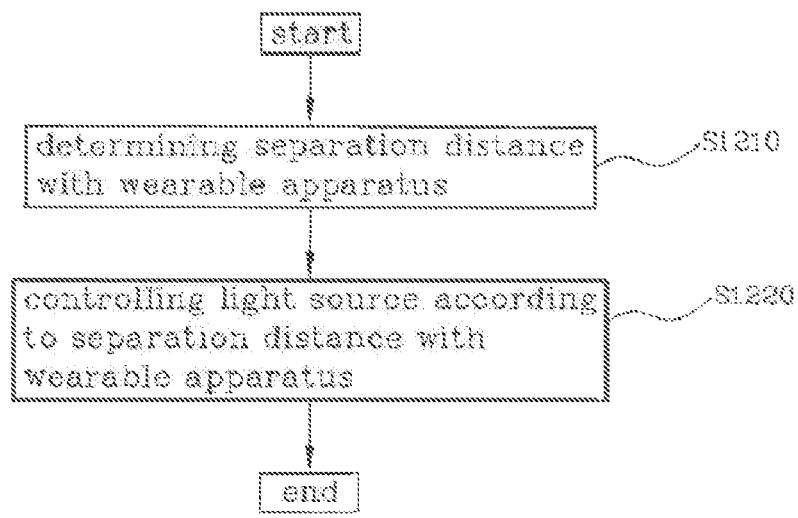
FIGS. 11 to 14 are views showing a method of controlling a lighting source of a display apparatus.
Figure 12:
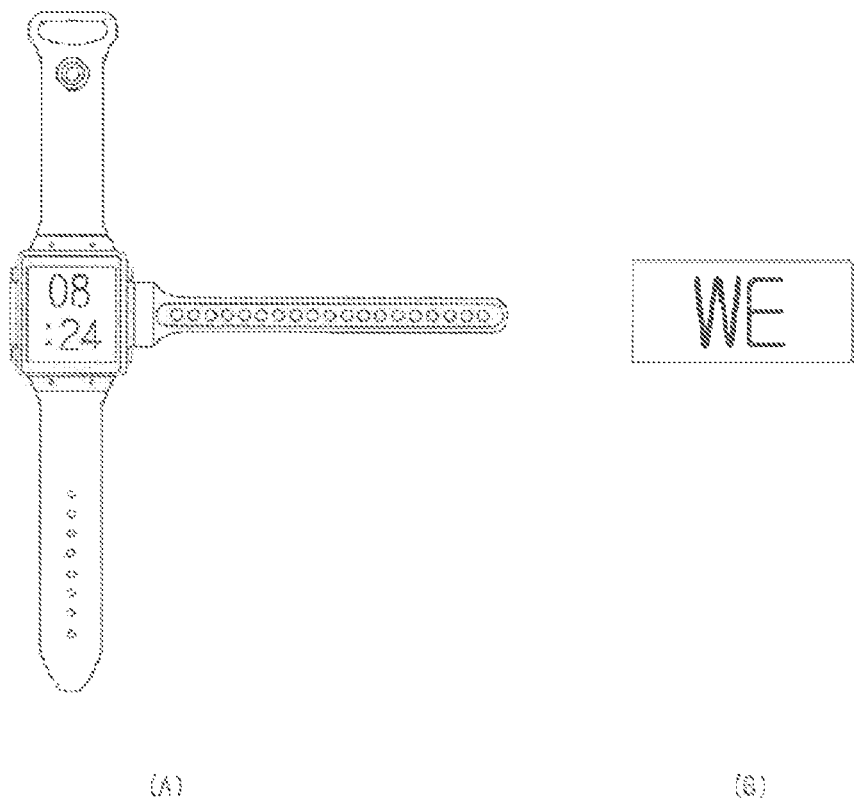
Figure 13:
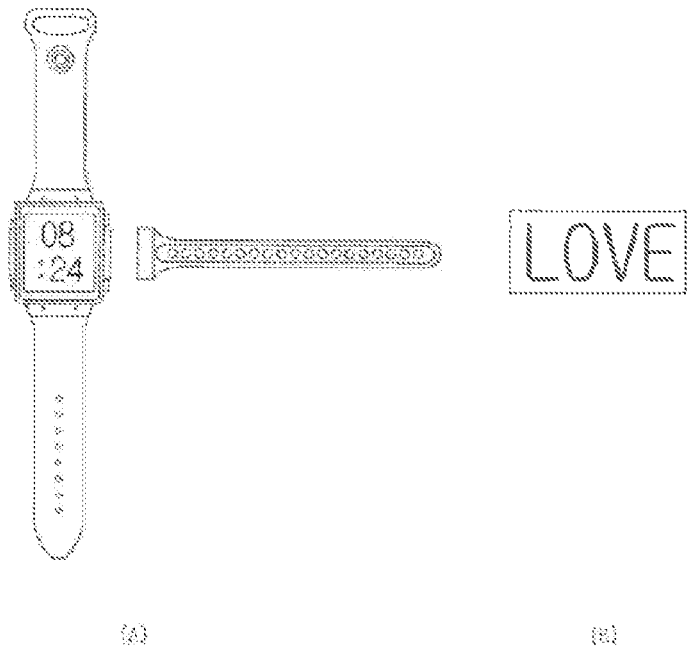

When an input image is "I LOVE U", the display apparatus may output the "I LOVE U" at one time, or sequentially output "I", "LOVE", and "U". The display apparatus controls the light source of the display apparatus according to a separation distance with the wearable apparatus. FIG. 11 is a view of a flowchart showing a method of controlling the light source of the display apparatus. In step S1210, the display apparatus determines a separation distance with the wearable apparatus. The display apparatus measures the separation distance with the wearable apparatus on the basis of intensity of a radio wave or intensity of a wireless signal received from the wearable apparatus. Alternatively, a distance between apparatuses may be measured by positional information obtained by using a GPS module of the wearable apparatus may measure, and positional information obtained by using a GPS module of the display apparatus. Alternatively, a distance between the display apparatus and the wearable apparatus may be determined by whether or not the display apparatus and the wearable apparatus are coupled with each other. Then, in step S1220, the display apparatus controls the light source according to the distance with the wearable apparatus. The display apparatus may change to display different images by using the light source on the basis of the distance. Alternatively, the display apparatus may change to display different images by using a gyro sensor, etc. according to a distance and a direction between the display apparatus and the wearable apparatus. For example, when the user wears the wearable apparatus on his or her left arm, and holds and shakes an LED stick with his or her right arm, images displayed by the display apparatus may vary when (a) resting the left arm, (b) putting the left arm on his or her chest, and (c) raising his or her left arm above the head.

Figure 14:
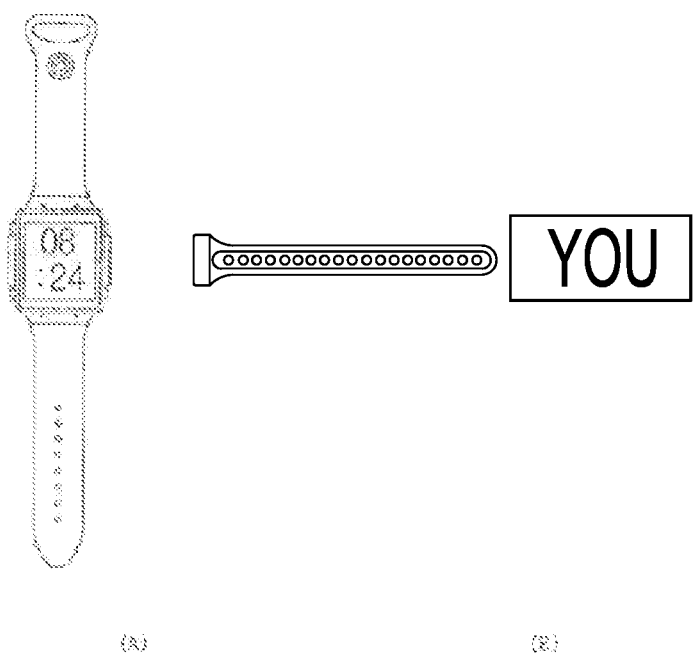

Referring to FIGS. 12 to 15, the display apparatus displays different images when the display apparatus is coupled with the wearable apparatus, when the display apparatus is positioned close to the wearable apparatus, and when the display apparatus is positioned within a long distance from the wearable apparatus. For example, when the display apparatus is coupled with the wearable apparatus as shown in FIG. 12(A), the display apparatus displays "WE" as shown in FIG. 12(B) by an afterimage effect. When the display apparatus is positioned within a short distance from the wearable apparatus as shown in FIG. 13(A), the display apparatus displays "LOVE" as shown in FIG. 13(B) by an afterimage effect. When the display apparatus is positioned far away from the wearable apparatus as shown in FIG. 14(A), the display apparatus displays "YOU" as shown in FIG. 14(B) by an afterimage effect. Determining a separation distance and controlling the display apparatus described above may be performed by the wearable apparatus or the display apparatus. The user may set a criterion for determining a short distance and a long distance in the wearable apparatus or the display apparatus. For example, the criterion for determining a short distance and a long distance may be set as follows: when the user wears the wearable apparatus in his or her left wrist, and holds and shakes the display apparatus with his or her left arm as FIG. 13, it is recognized as a short distance, and when the user wears the wearable apparatus his or her left wrist, and holds and shakes the display apparatus with his or her right arm as shown in FIG. 14, it is recognized as a long distance is recognized.

Figure 15:
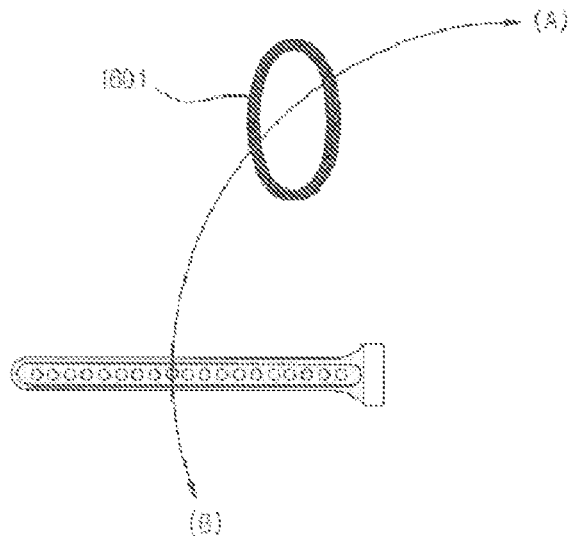
FIG. 15 is a view of a conceptual diagram showing a method of controlling light emission of a display apparatus.

As shown in FIG. 15, the user repeatedly shakes the display apparatus up and down repeatedly and moves in a first direction (A), then moves in a second direction (B), and repeatedly moves in a first direction (A) and in a second direction (B). When the user directly shakes the display apparatus with his or her hand, an image 1601 that is displayed becomes distorted by an afterimage effect since a shaking speed is not constant. In addition, when the image to be represented is a phrase, the entire phrase may not be represented when a length of the phrase is long and the user shakes the display apparatus with a narrow width. Accordingly, in order to represent a completed image through the display apparatus, light emission of the moving display apparatus may be controlled in consideration of the movement speed of the display apparatus.

Figure 16:
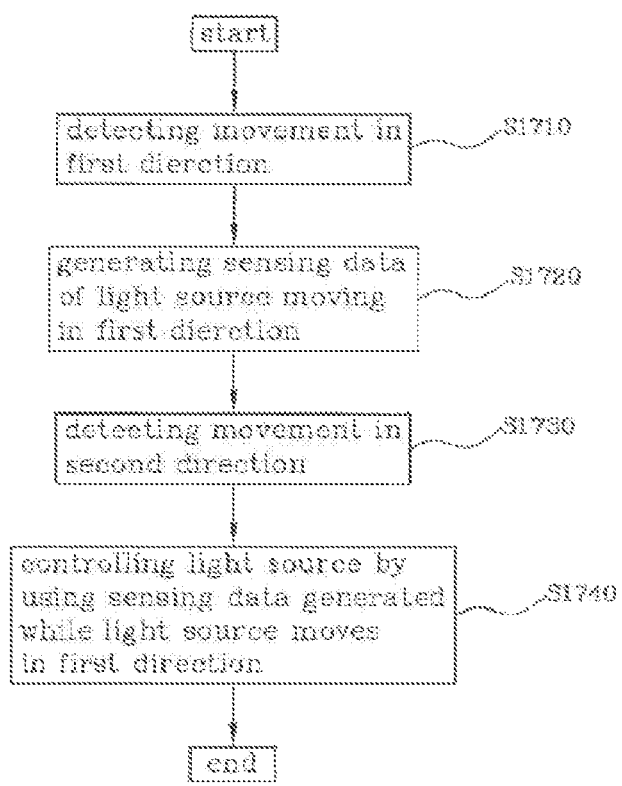
FIG. 16 is a view of a flowchart of controlling light emission of a display apparatus according to an embodiment.

As shown in a flowchart of FIG. 16, in step S1710, the display apparatus detects that the light source moves in a first direction, and in step S1720, the display apparatus generates status data of the light source moving in a first direction. The display apparatus senses a movement speed of the light source moving in a first direction, a movement distance of the light source, a movement time of the light source, changes in acceleration of the moving light source, and a movement trajectory of the light source, and generates sensing data. Then, in step S1730, the display apparatus detects that the light source moves in a second direction. For example, when the light source moves in a direction that does not continue to the first direction, the display apparatus determines that the light source moves in a second direction. For example, when the light source upwardly and linearly moves (first direction), and then moves leftward and linearly moves, the display apparatus determines the later direction as a second direction. Alternatively, when the light source moves leftward and draws an arc (first direction), and then moves rightward and draws an arc, the display apparatus determines the later direction as a second direction.

In step S1740, when the light source moves in a second direction, the display apparatus controls light emission of the light source by using the status information measured while the light source moves in a first direction. For example, based on a movement time, a movement distance, changes in acceleration when moving, etc. of the light source moving in a first direction, a movement time, a movement distance, changes in acceleration when moving, etc. of the light source moving in a second direction may be predicted. Based on the same, the display apparatus controls light emission of the light source moving in a second direction, and thus the display unit displays an image that is not distorted by using an afterimage effect. For example, when a second direction is a reverse direction to a first direction, the display apparatus determines in real time pixel values to be output by the light source moving in a second direction on the basis of at least one of a movement time, a movement distance, a movement speed, and changes in acceleration according to a movement trajectory which are measured while the light source moves in a first direction, and controls light emission of the light source by using the same such that a complete image is displayed.

Figure 17:
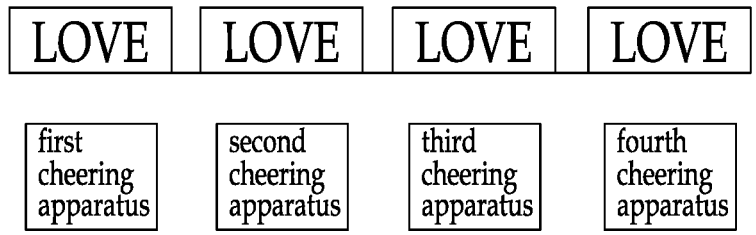
FIG. 17 is a view of an example of displaying a cheering phrase of a cheering apparatus according to an embodiment.

First cheering apparatus to fourth cheering apparatus of FIG. 17 may display a word "LOVE". Each of the cheering apparatuses may be configured with a display apparatus described above, and displays a phrase according to an afterimage effect by controlling the light source unit by itself. Each of the cheering apparatus may be configured with a display apparatus and a wearable apparatus. The display apparatus may display a phrase according to phrase data received from the wearable apparatus.

Figure 18:
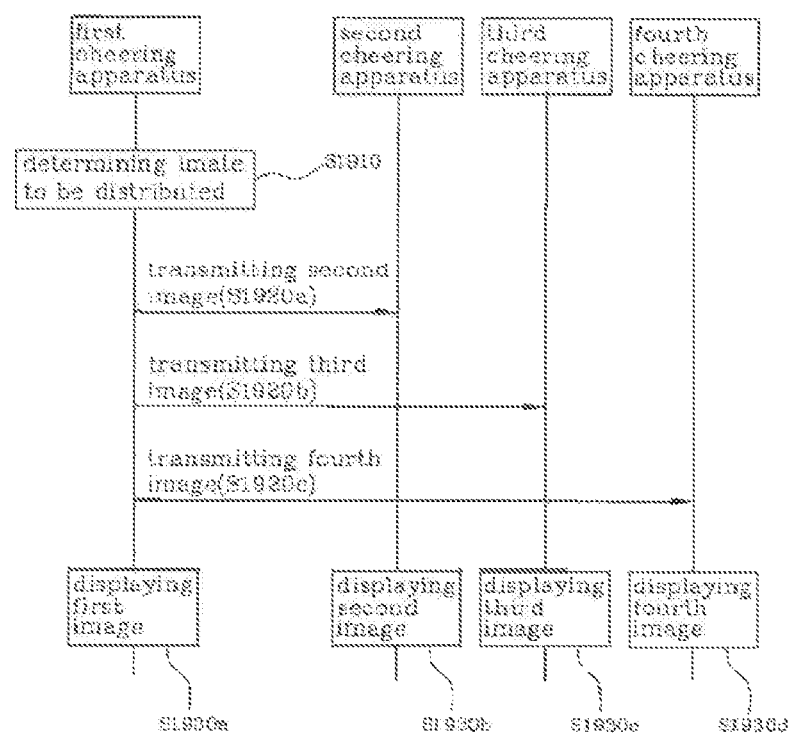
FIG. 18 is a view of a flowchart showing transmitting, between cheering apparatuses, image data.

In an embodiment of FIG. 18, a first cheering apparatus is a master apparatus, and transmitting image data from the master apparatus to other cheering apparatuses will be described. A second cheering apparatus may be a master apparatus or a plurality of master apparatuses may be present. In addition, data transmitted between cheering apparatuses may be text data related to a phrase rather than image data. When the first cheering apparatus makes an authority request for performing below operations to an external apparatus, the first cheering apparatus performs the below operations when the first cheering apparatus receives an approval message that assigns the authority by the external apparatus. When the external apparatus is a apparatus for performing authentication or an authentication server, the communication unit of the first cheering apparatus transmits an authority request message to the external apparatus, and performs distribution of an image after receiving an approval message from another external message and performing interaction with other cheering apparatuses.

First, in step S1910, the first cheering apparatus determines an image to be distributed to other cheering apparatuses. In the present embodiment, it is assumed that the first cheering apparatus distributes an image to three apparatuses. The first cheering apparatus pre-stores information of apparatuses that will receive an image. Alternatively, the first cheering apparatus may be set to distribute an image to all cheering apparatuses paired to the first cheering apparatus, or to output to a user a questionnaire for selecting cheering apparatuses to which an image will be distributed among apparatuses paired with the first cheering apparatus by using the output unit and to distribute the image to a apparatus selected by the user through the input unit. The first cheering apparatus may determine an original image as an image to be distributed. Alternatively, the first cheering apparatus may determine an image to be distributed by dividing an original image.

Then, in step S1920a, the first cheering apparatus transmits to the second cheering apparatus data of a second image which will be displayed by the second cheering apparatus, in step S1920b, transmits to the third cheering apparatus data of a third image which will be displayed by the third cheering apparatus, and in step S1920c, transmits to the fourth cheering apparatus data of a fourth image which will be displayed by the fourth cheering apparatus.

Then, in step 1930a, the first cheering apparatus displays the first image, in step 1930b, the second cheering apparatus displays the second image, in step 1930c, the third cheering apparatus displays the third image, and in step 1930d, the fourth cheering apparatus displays the fourth image. The cheering apparatuses may display respective images by performing operation of displaying an image on the basis of an afterimage effect.

Figure 19:
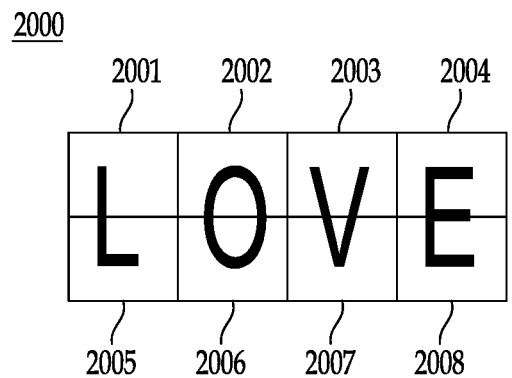
FIG. 19 is a view of a conceptual diagram showing an example of distributing, by a first cheering apparatus, an image.

According to a conceptual diagram of FIG. 19, an original image 2000 may be divided into two portions which are a first portion representing LO by including 2001, 2002, 2005, and 2006, and a second portion representing VE by including 2003, 2004, 2007, and 2008, or may be divided into four portions respectively representing letters of L, O, V, and E, or may be divided into eight portions (2001, 2002, . . . , 2008). A method of dividing an image may be determined by a selection input by the user. Alternatively, a number of images to be generated and distributed, a number of cheering apparatuses that will receive an image, a position of a cheering apparatus that will receive an image are considered. Meanwhile, a number of images to be generated and distributed, a number of cheering apparatuses that will receive an image, a position of a cheering apparatus that will receive an image may be manually determined on the basis of a selection input by the user.

Figure 20:
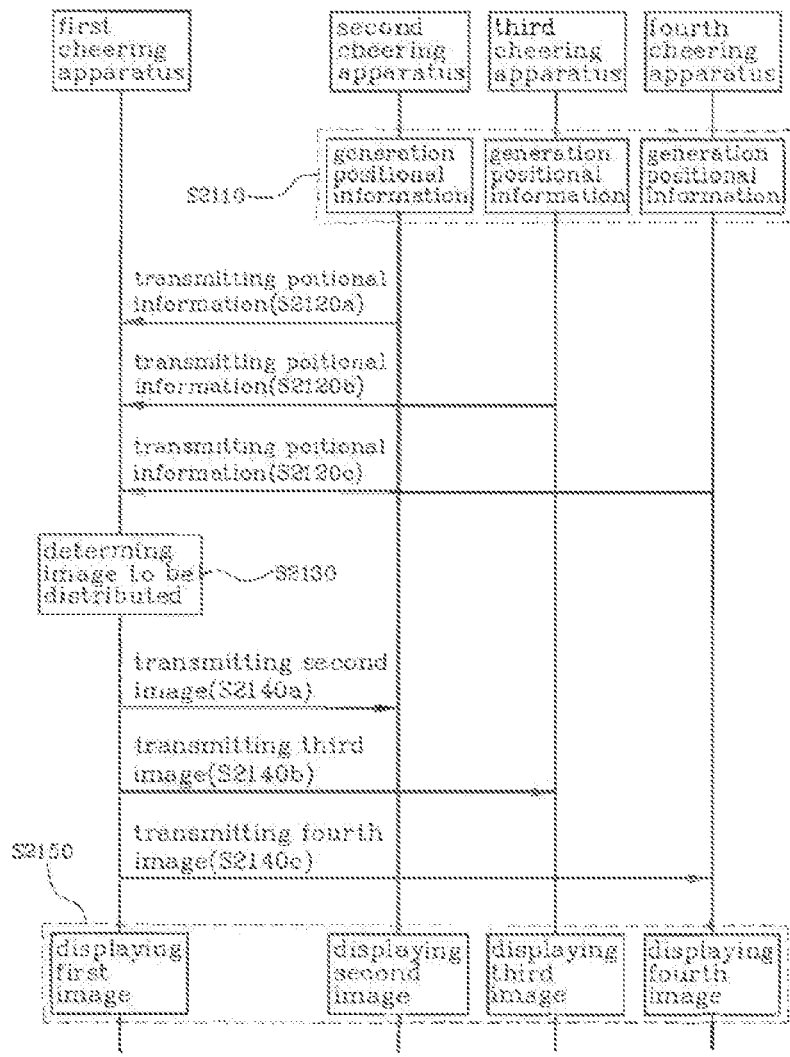
FIG. 20 is a view of a flowchart showing a method of providing, by a first cheering apparatus, to a second cheering apparatus data of an image that is distributed according to positional information of the second cheering apparatus.

In step S2110, according to a flowchart providing, by a first cheering apparatus of FIG. 20, image data distributed according to positional information of other cheering apparatuses, a second cheering apparatus, etc. generates positional information. The second cheering apparatus, etc. may be paired with the first cheering apparatus. The second cheering apparatus, etc. generates positional information according to a positional information request received from the first cheering apparatus. In steps S2120a, S2120b, and S2120c, the second cheering apparatus, etc. transfers the generated positional information to the first cheering apparatus.

Figure 21:
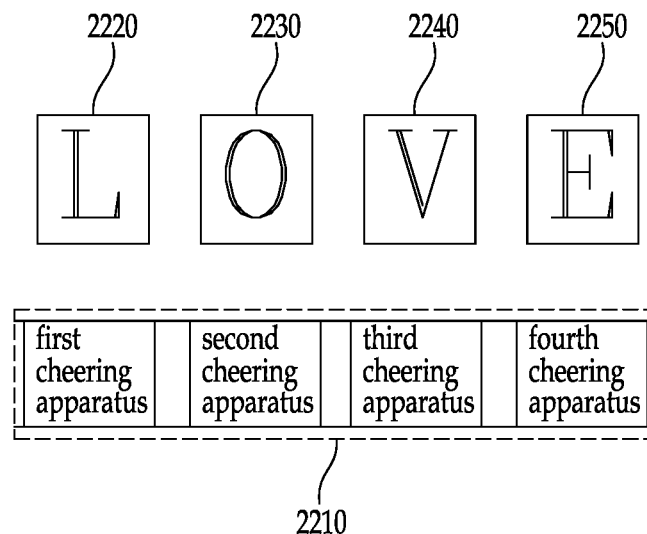
FIGS. 21 and 22 are views of a conceptual diagram of an example where an image is distributed.

The first cheering apparatus determines a distribution image and a distribution configuration of the cheering apparatuses on the basis of the positional information received from the second cheering apparatuses, and determines a method of distributing the image. When positions of the first to fourth cheering apparatuses which are determined by the first cheering apparatus on the basis of the positional information received from the second cheering apparatuses represent a horizontal line arrangement 2210 as shown in FIG. 21, the first cheering apparatus uniformly divides a cheering image 2000 of FIG. 19 along a horizontal line, and distributes to each cheering apparatus. Referring to FIG. 19, the first cheering apparatus determines an image 2220 representing L which corresponds to drawing reference numerals 2001 and 2005 as the first image that will be displayed by the first cheering apparatus, determines an image 2230 representing O which corresponds to drawing reference numerals 2002 and 2006 as the second image that will be displayed by the second cheering apparatus, determines an image 2240 representing V which corresponds to drawing reference numerals 2003 and 2007 as the third image that will be displayed by the third cheering apparatus, and determines an image 2250 representing E which corresponds to drawing reference numerals 2004 and 2008 as the fourth image that will be displayed by the fourth cheering apparatus.

Figure 22:
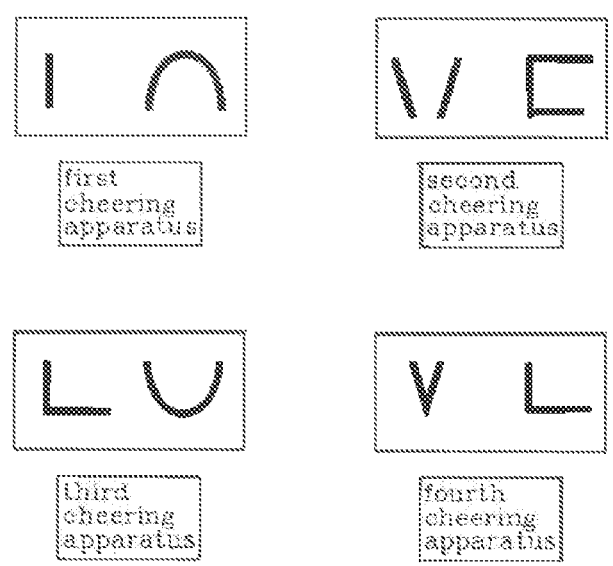

Alternatively, as shown in FIG. 22, when positions of first to fourth cheering apparatuses represent a two-row horizontal arrangement, the first cheering apparatus uniformly divides the cheering image 2000 of FIG. 19 as shown in FIG. 22, and distributes to each cheering apparatus. According to a user set, when the cheering apparatuses are arranges as shown in FIG. 22, the first cheering apparatus may distribute the image to the cheering apparatuses based on a phrase. For example, the first cheering apparatus may distribute the image to display L by the first cheering apparatus, O by the second cheering apparatus, V by the third cheering apparatus, etc. Image distribution is performed by distributing image data. Herein, distributed data may be image data, or an image representing phrase text data.

Figure 23:
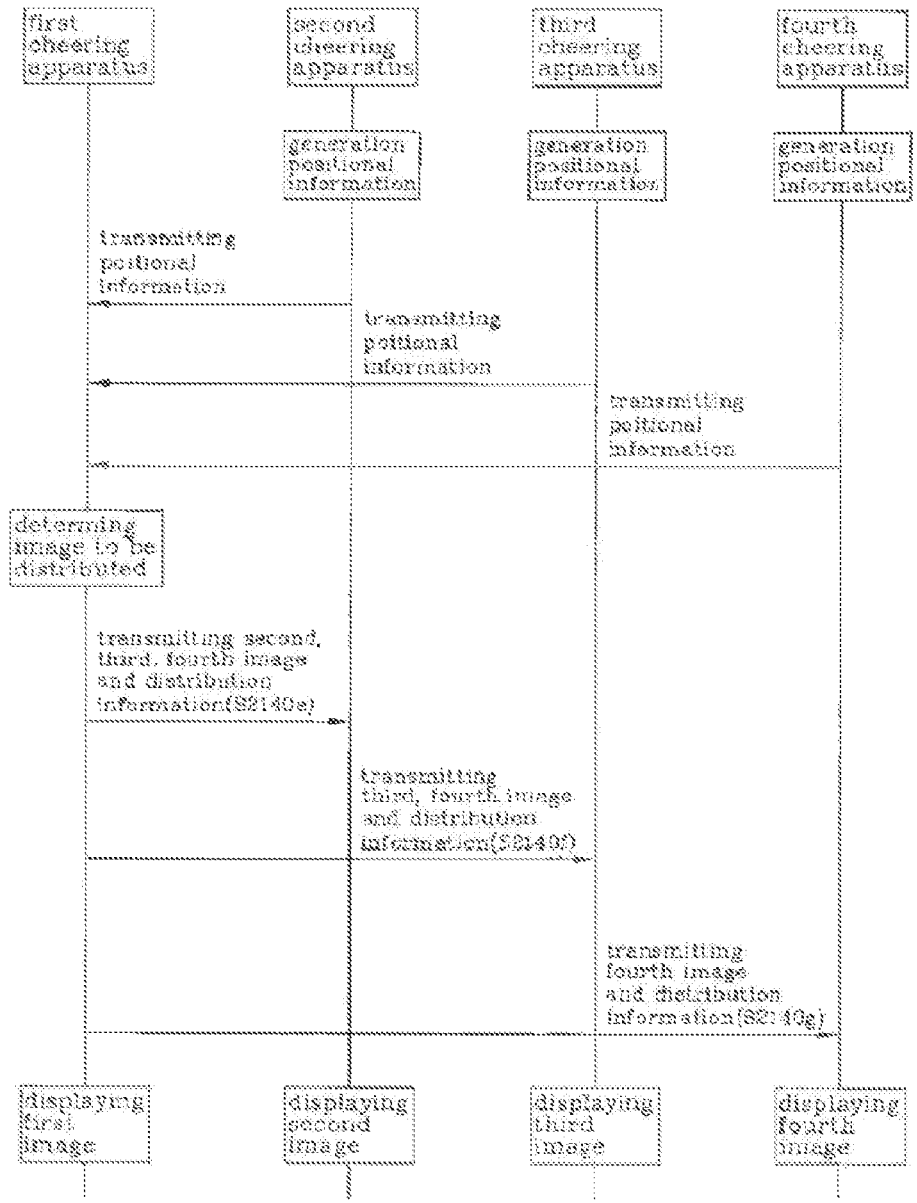
FIG. 23 is a view showing data transmission of an image distributed among cheering apparatuses.

FIG. 23 is a view showing spreading distribution image data between cheering apparatuses. A first cheering apparatus may transmit image data to a plurality of cheering apparatuses. However, as shown in FIG. 23, a first cheering apparatus may transmit image data to be distributed to a second cheering apparatus, and the second cheering apparatus may transmit to other cheering apparatuses another image data excluding image data displayed by the second cheering apparatus.

Figure 24:
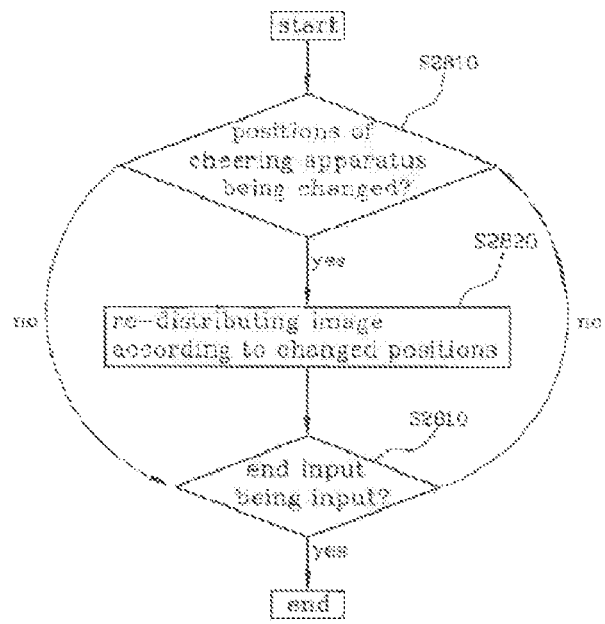
FIG. 24 is a view showing of re-distributing a display image according to an arrangement of cheering apparatuses.

A method of re-distributing image data will be described with reference to FIG. 24. In step S2810, a first cheering apparatus determines whether or not positions of cheering apparatuses have been changed, and determines whether or not positions have been changed by periodically receiving positional information from other cheering apparatuses. The cheering apparatuses periodically sense positional information, and when the cheering apparatuses get out a set range, the positional information is transmitted to the first cheering apparatus. The preset range may be a range in that the user shakes the cheering apparatus for displaying an image according to an afterimage effect. Then, the first cheering apparatus re-distributes an image according to the changed position of the cheering apparatuses. For example, when positions of neighboring cheering apparatuses have been change, the first cheering apparatus divides again an image on the basis of the changed position, and distributes again to the cheering apparatuses image data according to the image that is divided. In step S2830, the above process may be stopped according to an end input that is input by the user. When the user does not input an end command, the first cheering apparatus may periodically determine changes in position of the cheering apparatuses.

Figure 25:
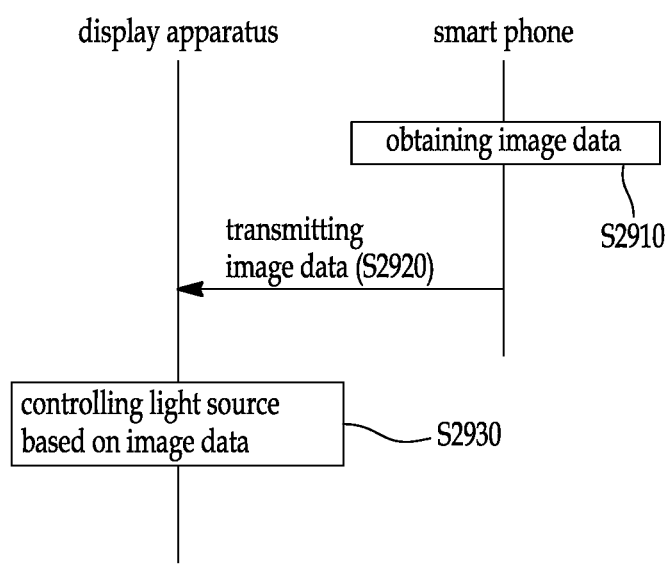
FIG. 25 is a view of a flowchart showing a method of displaying, by a display apparatus, an image by being directly connected to a smartphone.

By using a method similar as described above, a display apparatus may operate by being directly connected to a smartphone. It will be appreciated by those skilled in the art that a flowchart of FIG. 25 is not significantly different from the flowchart of FIG. 7. Operation between the display apparatus and the wearable apparatus which is described above may be applied to operation between the display apparatus and the smartphone, and thus detailed description thereof will be omitted.

In an embodiment, the smartphone may operate by an exclusive application for controlling the display apparatus. For example, the display apparatus may operate by interacting with an application of the smartphone. As described above, the smartphone may display an image according to an afterimage effect by operating as the display apparatus which directly uses an afterimage effect. The smartphone may operate by being connected to the wearable apparatus. Herein, displaying an image according to an afterimage effect by using connected between the display apparatus and the wearable apparatus which is described above is identically applied.

Figure 26:
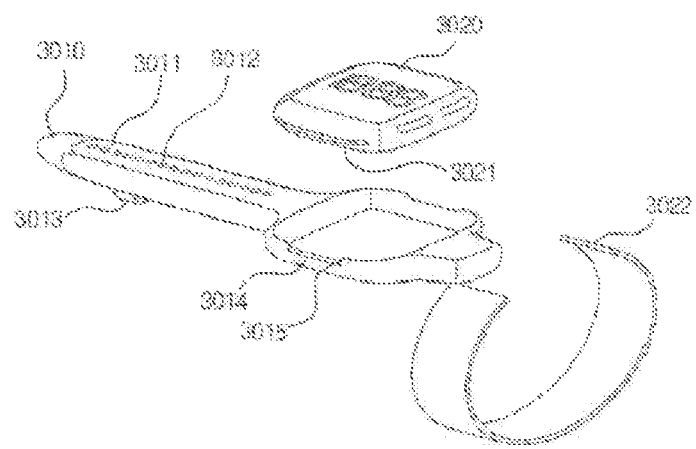
FIGS. 26 to 27 are views of a cheering apparatus configured by coupling a display apparatus and a wearable apparatus according to an embodiment.
Figure 27:
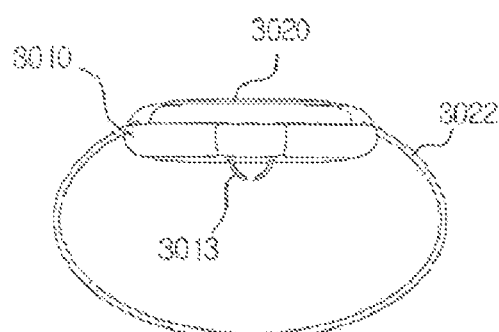

A display apparatus and a wearable apparatus of FIG. 26 include technical features of the above display apparatus and the wearable apparatus as it is. The display apparatus includes a housing 3010, a light source unit 3011 including at least one light source 3012, a first fixing unit 3013 for being attached on the body of the user, and a coupling unit 3014 in which the wearable apparatus is coupled. The first fixing unit 3013 may be put on a finger of the user. The first fixing unit 3013 may have a circular form. The first fixing unit 3013 may have a diameter less than 3 cm. The first fixing unit 3013 may have a diameter greater than 0.2 cm. The first fixing unit may be manufactured with flexible material.

The wearable apparatus includes a housing 3020, a second fixing unit 3022 for being attached on the body of the user, and a binding unit 3021 where the second fixing unit 3022 and the wearable apparatus bind with each other. The second fixing unit 3022 may have a circular form such that the same is put on a wrist of the user. The second fixing unit 3022 may have a diameter less than 10 cm. The first fixing unit 3013 may have a diameter greater than 3 cm. The second fixing unit may be may be manufactured with flexible material. Detailed descriptions of the display apparatus and the wearable apparatus overlap with the above descriptions, and thus detailed descriptions thereof will be omitted.

A single cheering apparatus may be configured by coupling the display apparatus and the wearable apparatus. The coupling unit 3014 of the display apparatus includes an installation unit 3015 where the housing 3020 of the wearable apparatus is installed. The coupling unit 3014 may further include a fixing means such that the installed housing 3020 is not separated. As an example of the fixing means, a latch (not shown) fixed in one surface of the housing 3020 may be used. For example, when the housing 3020 is installed in the installation unit 3015, the latch fixed on one surface of the housing 3020 is inserted to a groove (not shown) so that the housing 3020 is not separated from the installation unit 3015. Accordingly, the housing 3020 may have a lower cross-sectional area greater than an upper cross-sectional area so that the housing 3020 is coupled with a lower part of the wearable apparatus in a strong manner. Alternatively, at least one of the housing 3020 and the installation unit 3015 may include a magnetic for tight coupling.

The cheering apparatus may be attached on the body of the user by using the first fixing unit 3013 of the display apparatus and the second fixing unit 3022 of the wearable apparatus. The first fixing unit 3013 may be put on a finger of the user, and the second fixing unit 3022 may be put on a wrist of the user.

Figure 28:
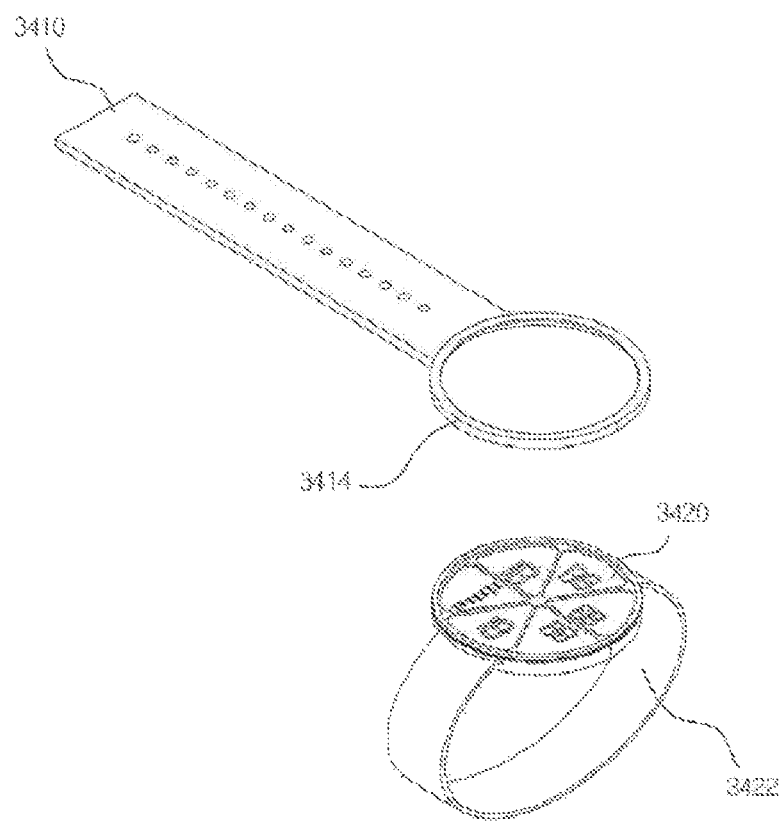
FIG. 28 is a view showing a cheering apparatus according to another embodiment.

FIG. 28 is a perspective view showing a cheering apparatus according to another embodiment. A display apparatus and a wearable apparatus include technical features of the above display apparatus and the wearable apparatus as it is. When a housing 3420 of the wearable apparatus has a circular form, the display apparatus may be coupled with the housing 3420 of the wearable apparatus by screw type coupling. For example, screw threads are formed in an outer surface of the housing 3420 of the wearable apparatus, and in the coupling unit 3414 of the housing of the display apparatus in association with the screw threads formed in the outer surface of the housing 3420 of the wearable apparatus.

Figure 29:
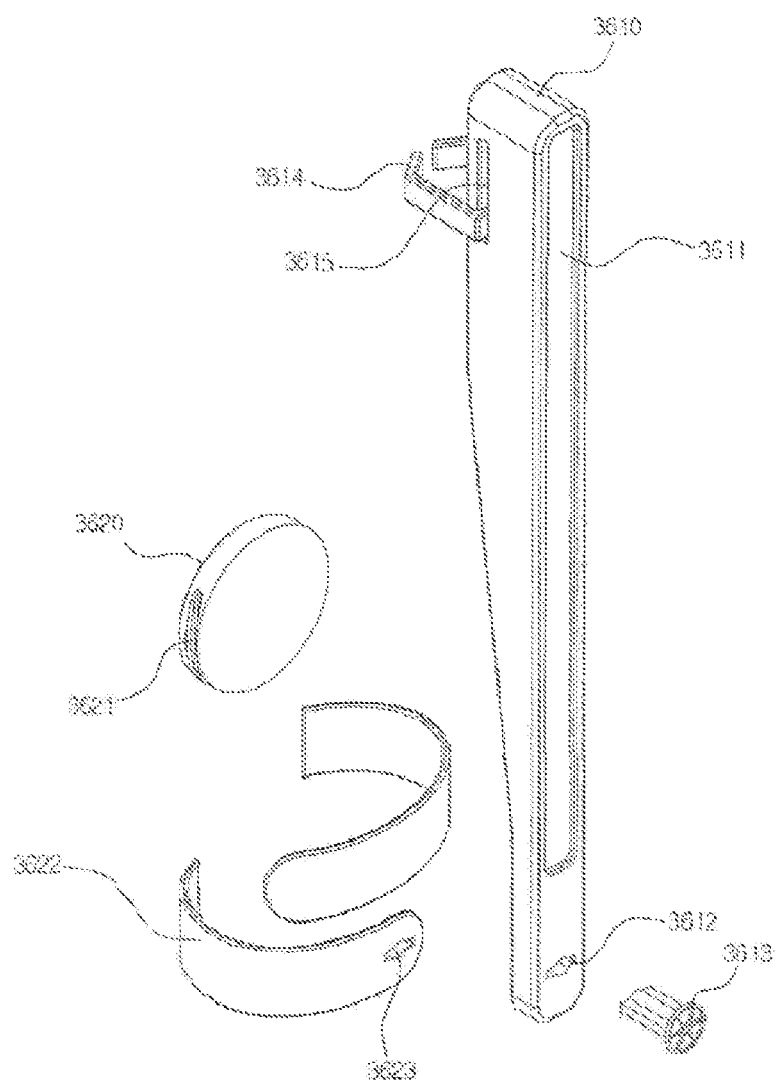
FIG. 29 is a perspective view showing coupling of a cheering apparatus according to another embodiment.

FIG. 29 is a perspective view showing coupling of a cheering apparatus according to another embodiment. As a cheering apparatus may be configured with a display apparatus and a wearable apparatus, the display apparatus includes a housing 3610, a light source unit 3611 including at least one light source, a first coupling groove 3612 and a coupling screw 3613 for coupling with the wearable apparatus 3620, a first coupling unit 3614 for being attached on the body of the user, and a slider 3615 changing a position of the first coupling unit 3614 in which the first coupling unit 3614 is fixed. The first coupling unit 3614 may change in position in a longitudinal direction of the housing 3610 along the slider 3615. The first coupling unit 3614 may vertically move along the slider 3615. (Refer to FIG. 29)

The wearable apparatus includes a housing 3620, a second fixing unit 3622 for being attached on the body of the user, a coupling unit 3621 where the second fixing unit 3622 and the housing 3620 are coupled with each other, and a second coupling grove 3623 for coupling with the display apparatus. The first coupling groove 3612 of the display apparatus and the second coupling groove 3623 of the wearable apparatus 3620 may be coupled with each other by using the coupling screw 3613, and the second coupling groove 3623 and the coupling screw 3613 may have a detachable structure.

The display apparatus may be coupled with the wearable apparatus such that the light source unit 3611 faces a direction opposite to the display unit included in the housing 3620 of the wearable apparatus. For example, based on the first coupling groove 3612, the display apparatus 3610 and the wearable apparatus 3620 may be coupled such that the light source unit 3611 faces a direction identical to a screw head of the coupling screw 3613.

The present invention has industrial applicability to a wearable apparatus and a display apparatus performing data communication with the wearable apparatus, and to a method of simply displaying a cheering image in a clustered form with various users by using the apparatus.

What is claimed is:

1. A method of displaying an image by using a light source, the method comprising steps of:
   receiving an image data from an external device, the image data comprising at least one of an image or text;
   determining a portion of image data to be distributed to one or more display devices based on an interaction with the one or more display devices;
   performing an authorization procedure to distribute the image data in response to an authentication authority or server; and
   controlling the distribution of image data as a result of determining step,
   wherein the determining step comprises dividing the image data into one or more portions automatically or manually, in consideration of at least one of the number of image data to be generated, the number of the display devices for receiving the image data, and a position of the display device, and
   wherein the performing step comprises transmitting an authority request message to the authentication authority or server, and receiving an authority approval message from the authentication authority or server.

2. The method of claim 1, wherein the determining step further comprises receiving a position information from the display device, and determining image data to be transmitted to the display device based on positional information of the display device.

3. The method of claim 2, wherein the controlling step further comprises detecting a change in position of the display device, and transmitting to the display device the image data determined based on the changed position of the display device.

4. A method of displaying an image by using a light source, the method comprising of:
   receiving an image data from an external device, the image data comprising at least one of an image or text;
   determining a portion of image data to be distributed to one or more display devices based on an interaction with the one or more display devices;
   performing an authorization procedure to distribute the image data in response to the display device; and
   controlling the distribution of image data as a result of the determining step,
   wherein the determining step includes dividing the image data into one or more portions automatically or manually, in consideration of at least one of the number of image data to be generated, the number of the display devices for receiving the image data, and a position of the display device, and
   wherein the performing step comprises transmitting an authority request message to the display device, and receiving an authority approval message from the display device.

5. The method of claim 4, wherein the controlling step controls the distribution of image data to be distributed only to the display device that transmitted the approval message among a plurality of display devices.

* * * * *